(12) United States Patent
Song et al.

(10) Patent No.: US 11,002,951 B2
(45) Date of Patent: May 11, 2021

(54) OCULARS AND DISPLAY DEVICES INCLUDING THE SAME

(71) Applicant: Zhejiang Sunny Optical Co., Ltd, Ningbo (CN)

(72) Inventors: Litong Song, Ningbo (CN); Fujian Dai, Ningbo (CN); Yinfang Jin, Ningbo (CN)

(73) Assignee: Zhejiang Sunny Optical Co., Ltd, Zhejiang (CN)

( * ) Notice: Subject to any disclaimer, the term of this patent is extended or adjusted under 35 U.S.C. 154(b) by 0 days.

(21) Appl. No.: 15/780,082

(22) PCT Filed: May 17, 2017

(86) PCT No.: PCT/CN2017/084660
§ 371 (c)(1),
(2) Date: May 30, 2018

(87) PCT Pub. No.: WO2018/145367
PCT Pub. Date: Aug. 16, 2018

(65) Prior Publication Data
US 2018/0275392 A1    Sep. 27, 2018

(30) Foreign Application Priority Data
Feb. 8, 2017   (CN) .......................... 201710069054.7

(51) Int. Cl.
*G02B 25/00* (2006.01)
*G02B 27/00* (2006.01)
*G02B 27/01* (2006.01)

(52) U.S. Cl.
CPC ....... *G02B 25/001* (2013.01); *G02B 27/0025* (2013.01); *G02B 27/0172* (2013.01)

(58) Field of Classification Search
CPC ...... G02B 25/00; G02B 25/001; G02B 27/00; G02B 27/0025; G02B 27/01; G02B 21/02;
(Continued)

(56) References Cited

U.S. PATENT DOCUMENTS 6,130,785 A * 10/2000 Abe ..................... G02B 5/1895
359/570
8,139,295 B2 * 3/2012 Suzuki ................ G02B 5/1823
359/576
(Continued)

FOREIGN PATENT DOCUMENTS

| CN | 104536129 A | 4/2015 |
|---|---|---|
| CN | 204360008 U | 5/2015 |

(Continued)

*Primary Examiner* — Jie Lei
(74) *Attorney, Agent, or Firm* — Sughrue Mion, PLLC

(57) ABSTRACT

The present disclosure provides an ocular assembly. The ocular assembly including sequentially along an optical axis from an object side to an image side: a first lens with a positive refractive power has a convex object-side surface, and a second lens has a concave image-side surface, wherein at least one of the object-side surface of the first lens, an image-side surface of the first lens, an object-side surface of the second lens, and an image-side surface of the second lens is a Fresnel structure surface, wherein half of a maximal field-of-view HFOV of the ocular assembly satisfies: HFOV>40°, an axial distance TTL of the object-side surface of the first lens to the image plane and a total effective focal length f of the ocular assembly satisfy $1<TTL/f<1.5$.

20 Claims, 12 Drawing Sheets

(58) Field of Classification Search
CPC . G02B 9/60; G02B 9/62; G02B 13/18; G02B 13/0045; G02B 3/18; G02B 5/18; G02B 5/1814
USPC ....... 359/646, 691, 692, 576, 643, 717, 793, 359/742, 743
See application file for complete search history.

(56) References Cited

U.S. PATENT DOCUMENTS

| | | | |
|---|---|---|---|
| 9,104,019 B2 | 8/2015 | Okano | |
| 2009/0052040 A1* | 2/2009 | Suzuki | G02B 5/1842 359/576 |
| 2014/0347739 A1 | 11/2014 | Okano | |

FOREIGN PATENT DOCUMENTS

| | | |
|---|---|---|
| CN | 204964882 U | 1/2016 |
| CN | 106249399 A | 12/2016 |
| JP | 2008-58810 A | 3/2008 |

\* cited by examiner

OCULARS AND DISPLAY DEVICES INCLUDING THE SAME

CROSS REFERENCE TO RELATED APPLICATIONS

This application is a National Stage of International Application No. PCT/CN2017/084660 filed May 17, 2017, claiming priority based on Chinese Patent Application No. 201710069054.7, filed Feb. 8, 2017, the entire disclosures of both being hereby incorporated by reference.

TECHNICAL FIELD

The present disclosure relates to an ocular assembly, and particularly, to an ocular assembly used in a head-mounted display device. The head-mounted display device may be, for example, a head-mounted virtual reality (VR) display device. The present disclosure also relates to a display device provided with the ocular assembly.

BACKGROUND

In recent years, as the computer technology develops rapidly, virtual reality (VR) has become increasingly mature and perfect, and has been applicable to more and more professional and consumer fields. The VR ocular, as a core optical element of head-mounted display, has a direct impact on the disclosure and experience of the device. Therefore, there is a stringent requirement on the imaging and appearance quality for the ocular assembly.

The head-mounted ocular system and the head-mounted display device proposed in the prior art can correct aberrations while obtaining a relatively large field-of-view, ensuring a viewing experience with a large viewing angle. However, in order to meet the increasingly higher market demands, there is still room for further optimizing the existing ocular systems in terms of miniaturization, high image quality and wide-angle.

SUMMARY

The present disclosure is intended to provide a miniaturized ocular assembly to allow an effective correction of spherical aberration and chromatic aberration of the system and improve the imaging quality, while satisfying the requirements of being wide-angle and being light and thin of the VR ocular.

According to an aspect of the present disclosure, an ocular assembly is provided, the ocular assembly from an object side to an image side along an optical axis sequentially having a first lens and a second lens, wherein the first lens may have a positive refractive power and its object-side surface may be a convex surface, an image-side surface of the second lens may be a concave surface, and at least one surface from the object-side surface of the first lens to the image-side surface of the second lens along the optical axis is a Fresnel structure surface, the Fresnel structure surface including a plurality of annular bands sequentially arranged to form serrated surfaces, wherein each annular band may include a working surface and a non-working surface.

According to an embodiment of the present invention, half of a maximal field-of-view HFOV of the ocular assembly may satisfy: HFOV>40°, for example, HFOV≥43.43°.

According to an embodiment of the present invention, the effective focal length f1 of the first lens and the total effective focal length f of the ocular assembly may satisfy 0.6<f1/f<1.5, for example, 0.68≤f1/f≤1.1.

According to an embodiment of the present invention, on the Fresnel structure surface of the second surface of the ocular assembly, the working surface is aspheric and the non-working surface is a straight bevel in the $i^{th}$ annular band counted from the paraxial area towards the edges. The angle between the $i^{th}$ annular band and the optical axis may satisfy the conditional formula: 0°≤θi≤5°, for example, 1°≤θi≤5°.

According to an embodiment of the present invention, on the Fresnel structure surface of the second surface of the ocular assembly, the width zi of the $i^{th}$ annular band from the paraxial area towards the edges may satisfy 0.08 mm≤zi≤3.5 mm, for example, 0.2 mm≤zi≤0.5 mm; and the depth di of the $i^{th}$ annular band can satisfy 0 mm<di≤0.5 mm, for example, 0 mm<di≤0.404 mm.

According to an embodiment of the present invention, both the object-side surface and the image-side surface of the first lens may be aspheric, and both the object-side surface and the image-side surface of the second lens may be aspheric.

According to an embodiment of the present invention, a plurality of annular bands on the Fresnel structure surface of the second surface of the ocular assembly are arranged on a base surface, which may be planar or curved.

According to an embodiment of the present invention, the axial distance TTL from the object-side surface of the first lens to the image plane and the total effective focal length f of the ocular assembly may satisfy 1<TTL/f<1.5, for example, 1.1≤TTL/f≤1.2.

According to an embodiment of the present invention, the total effective focal length f of the ocular assembly and the axial distance TD from the object-side surface of the first lens to the image-side surface of the second lens may satisfy 2<f/TD<5.

According to an embodiment of the present invention, the effective radius DT11 of the object-side surface of the first lens and the effective radius DT21 of the object-side surface of the second lens may satisfy 0.7<DT11/DT21<1, for example, 0.92≤DT11/DT21≤0.97.

According to another aspect of the present invention, a display device that can be equipped with the above ocular assembly is also provided.

According to another aspect of the present invention, a head-mounted VR display device that can be equipped with the above ocular assembly is also provided.

BRIEF DESCRIPTION OF THE DRAWINGS

The above and other advantages of the embodiments of the present disclosure will become apparent through detailed descriptions with reference to the accompanying drawings, which are intended to illustrate, but not to limit, the exemplary embodiments of this disclosure. In the drawings.

DETAILED DESCRIPTION OF EMBODIMENTS

Figure 1:
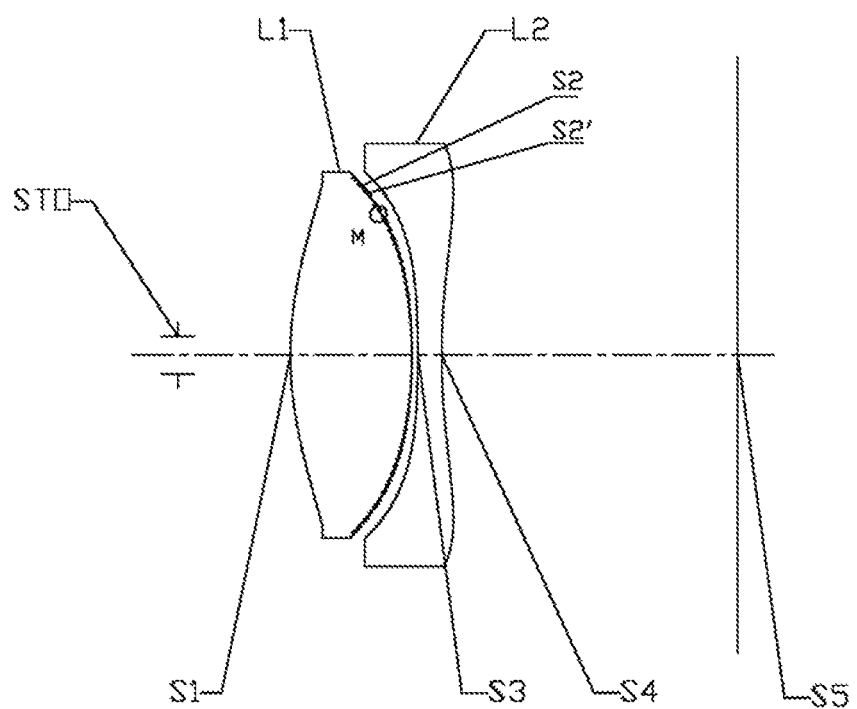
FIG. 1 illustrates a schematic structural view of an ocular assembly of embodiment 1 of the present disclosure.

For better understanding the present disclosure, various aspects of the present disclosure will be described in more details with reference to the drawings. It should be understood that these detailed descriptions are merely illustrative of exemplary embodiments of the disclosure and do not in any way limit the scope of the disclosure. Throughout the detailed descriptions, the same reference numerals refer to the same elements. The expression "and/or" includes one of the listed relevant items or any or all combinations of more than one of the listed relevant items.

It should be noted that, in this specification, the terms, i.e., the first, the second and the like are only used to distinguish one feature from another feature without any limitation on the features. Accordingly, the first lens discussed below may also be referred to as a second lens or a third lens without departing from the teaching of the present disclosure.

In the drawings, the thickness, size and shape of a lens may be slightly exaggerated for convenience of illustration, however, it should be understood that the dimensions of various components are not limited by the drawings, but may be appropriately adjusted within a certain range. In particular, shapes of spherical surfaces or aspheric surfaces in the drawings are shown by way of example. That is, shapes of the spherical surfaces or the aspheric surfaces are not limited to the shapes of the spherical surfaces or the aspheric surfaces shown in the accompanying drawings. The drawings are merely illustrative and not strictly drawn to scale.

In addition, the paraxial area means an area near the optical axis. The first lens is the lens close to the object and the second lens is a lens close to the photosensitive element. Herein, the surface of each lens, which is closest to the object, is called an object-side surface; and the surface of each lens, which is closest to the imaging plane, is called an image-side surface.

It should be further understood that the terms "comprising," "including," "having," "containing" and/or "contain," when used in the specification, specify the presence of stated features, unities, steps, operations, elements and/or components, but do not exclude the presence or addition of one or more other features, unities, steps, operations, elements, components and/or combinations thereof. In addition, expressions, such as "at least one of," when preceding a list of features, modify the entire list of features rather than an individual element in the list. Further, the use of "may", when describing implementations of the present disclosure, refers to "one or more implementations of the present disclosure." Also, the term "exemplary" is intended to refer to an example or illustration.

Unless otherwise defined, all terms (including technical and scientific terms) used herein have the same meaning as commonly understood by those ordinary skilled in the art to which this disclosure belongs. It should be also understood that terms (such as those defined in commonly used dictionaries) should be interpreted as having a meaning that is consistent with the meanings in the context of the relevant art and will not be interpreted in an idealized or over formal sense unless it is herein explicitly limited.

The features, principles, and other aspects of the present disclosure are described in details below with reference to FIGS. 1 to 11C in combination with specific embodiments.

Embodiment 1

Embodiment 1 of the present disclosure provides an ocular assembly. Referring to FIG. 1, the ocular assembly according to embodiment 1 of the present disclosure sequentially includes a first lens L1, a second lens L2, and a photosensitive element from an object side to an image side along an optical axis.

The parameters of each optical surface of the first lens L1, the second lens L2, and the photosensitive element are shown in table 1 below.

TABLE 1

| Surface No. | Surface Type | Curvature Radius | Thickness | Material | Conic Coefficient |
|---|---|---|---|---|---|
| OBJ | spherical | infinite | −2500.0000 | | |
| STO | spherical | infinite | 12.0000 | | |
| S1 | aspheric | 39.7087 | 12.9302 | 1.49/57.4 | 1.1352 |
| S2 | Fresnel | −57.4371 | 0.6282 | | 0.7947 |
| S3 | aspheric | −110.5341 | 2.5188 | 1.58/30.2 | −49.9890 |
| S4 | aspheric | 67.4886 | 31.4986 | | −49.9770 |
| S5 | spherical | infinite | | | |

The aspheric high order coefficients A4 and A6 of the first lens L1 and the second lens L2 are shown in table 2 below.

TABLE 2

| Surface No. | A4 | A6 |
|---|---|---|
| S1 | −7.2411E−06 | −1.7127E−08 |
| S2 | −2.1455E−05 | 0.0000E+00 |
| S3 | −2.4183E−05 | −1.5126E−08 |
| S4 | 5.1254E−06 | −2.4272E−08 |

Referring to tables 1 and 2 and as illustrated in FIG. 1, the first lens L1 may have a positive refractive power and its object-side surface S1 may be convex, and an image-side surface S4 of the second lens L2 may be concave. Among the surfaces from the object-side surface S1 of the first lens L1 to the image-side surface S4 of the second lens L2 along the optical axis, an image-side surface S2 of the first lens L1 may be a Fresnel structure surface.

Figure 2:
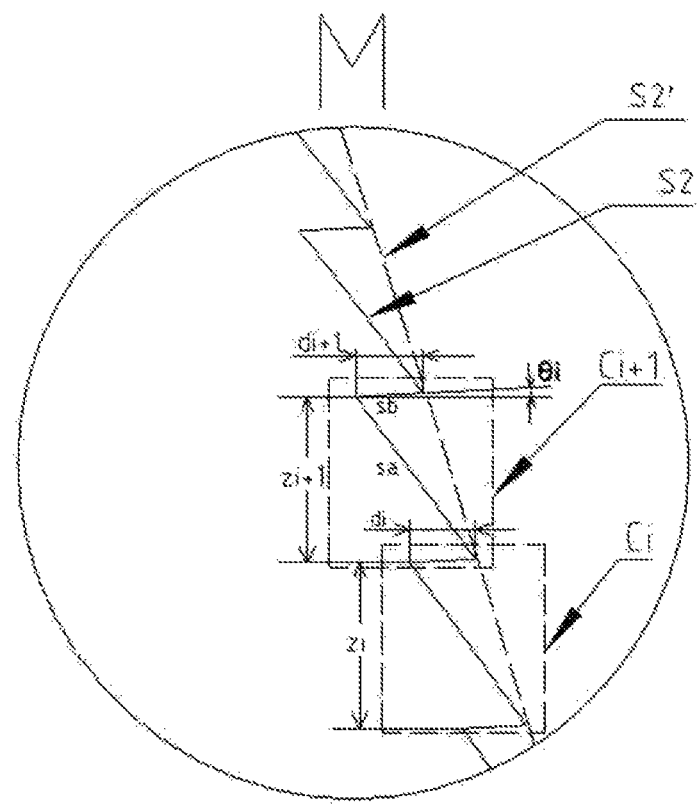
FIG. 2 illustrates a partially enlarged view of the Fresnel structure surface in embodiment 1.

The Fresnel structure surface may comprise a plurality of annular bands Ci (where i is a natural number) sequentially arranged to form a serrated surface. The serrated surface of the Fresnel structure surface is shown in details in FIG. 2. As shown in FIG. 2, between the $i^{th}$ annular band and the $i+1^{th}$ annular band, which are counted from the paraxial area towards the edges, there may be a vertical space zi and the vertical spaces of every two adjacent annular bands are equal. In embodiment 1, the vertical space zi satisfies 0.2 mm≤zi≤0.5 mm, for example, zi=0.3 mm. The annular bands on the Fresnel structure surface of the second surface S2 of the ocular assembly are arranged on the base surface S2', and the base surface S2' may be a curved surface. The depth di of the $i^{th}$ annular band counted from the paraxial area towards the edges may satisfy 0.0 mm<di≤0.338 mm. By properly arranging the structure of annular bands of the Fresnel structure surface, the impact of stray light on the imaging quality may be effectively reduced, while the comfortableness of watching the picture lattice by human eyes can be ensured.

Each annular band Ci may include a working surface Sa and a non-working surface Sb. The working surface Sa may satisfy the following formula (1).

$$x = \frac{ch^2}{1+\sqrt{1-(k+1)c^2h^2}} + \sum Aih^i \quad (1)$$

where, h is the height from any point on the working surface Sa to the optical axis, c is the curvature of the vertex, k is the conic constant, and Ai is the correction coefficient of the $i^{th}$ order of the aspheric surface. In the annular bands of embodiment 1, the working surface may be aspheric, and the non-working surface Sb may be straight bevel, and an angle θi between the non-working surface Sb and the optical axis may satisfy 0°≤θi≤5°, for example, θi=1°. By properly arranging the structure of the annular bands of the Fresnel structure surface, the lens can be ensured to have a good processability and the stray light of the optical system can be reduced.

In embodiment 1, half of the maximal field-of-view HFOV of the ocular assembly may be set as: HFOV>40°, for example, HFOV=47.5°. By setting the ocular assembly to have a larger half of a maximal field-of-view HFOV, the viewing area of the ocular assembly can be made larger than the sensitive visual area of the human eyes, so that better immersion can be obtained.

In embodiment 1, the ocular assembly may have a total effective focal length f. The effective focal length f1 of the first lens L1 and the total effective focal length f of the ocular assembly may satisfy 0.6<f1/f<1.5, for example, f1/f=0.68. By properly arranging the refractive powers of the two lenses, the chromatic aberration of the optical system may be then reduced.

As illustrated in FIG. 1, the object-side surface S1 and the image-side surface S2 of the first lens L1 may be aspheric, and the object-side surface S3 and the image-side surface S4 of the second lens L2 may be aspheric. The shape of each lens is set by such means to ensure that the curvature of field and the spherical aberration of the optical system can be effectively corrected and the imaging quality of the system may be improved.

A plurality of annular bands Ci in the Fresnel structure surface of the second surface S2 of the ocular assembly may be arranged on a base surface, and the base surface may be a plane or curved surface. When the base surface is plane, it is beneficial in reducing the thickness of the lens to meet the requirements of being light and thin of the ocular assembly. When the base surface is curved, it is beneficial to image quality of the surrounding field-of-view, thereby enhancing the overall clarity of the imaging.

In an exemplary embodiment of the present disclosure, the axial distance TTL from the object-side surface S1 of the first lens L1 to the image plane and the total effective focal length f of the ocular assembly may satisfy 1<TTL/f<1.5, so as to ensure a relatively high imaging quality in a relatively large field-of-view, for example, TTL/f=1.2 in this embodiment 1.

In an exemplary embodiment of the present disclosure, the total effective focal length f of the ocular assembly and the axial distance TD from the object-side surface S1 of the first lens L1 to the image-side surface S4 of the second lens L2 may satisfy: 2<f/TD<5, to make the lens compact, so as to meet the requirements of being light and thin and the machining accuracy of the ocular assembly, for example, f/TD=3.19 in this embodiment 1.

In an exemplary embodiment of the present disclosure, the effective radius DT11 of the object-side surface S1 of the first lens L1 and the effective radius DT21 of the object-side surface S3 of the second lens L2 may satisfy 0.7<DT11/DT21<1, which eliminates the spherical aberration of the optical system so as to improve the imaging quality, for example, DT11/DT21=0.94 in this embodiment 1.

Figure 3A:
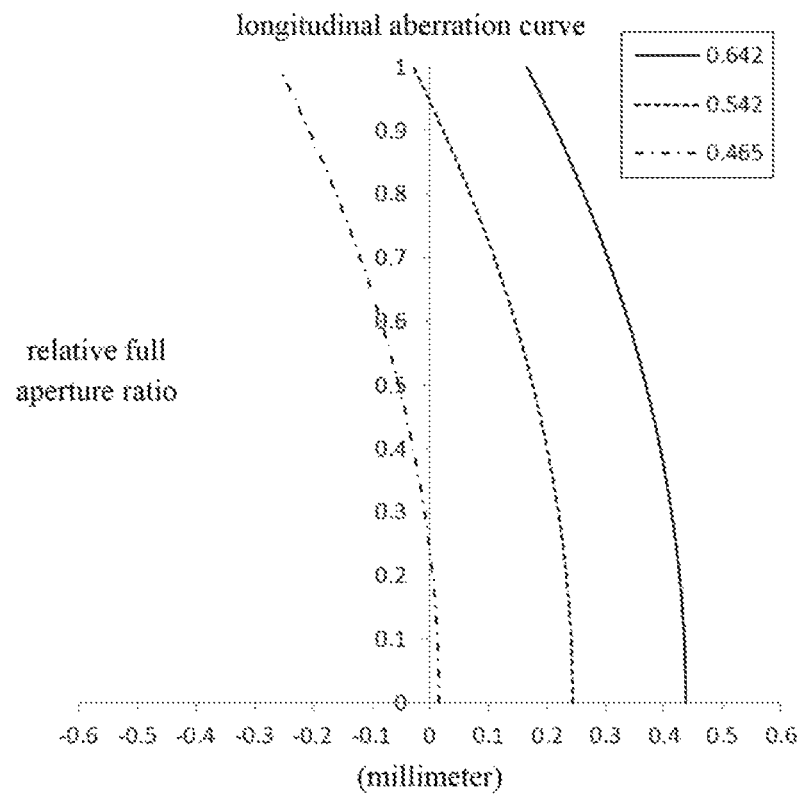
FIG. 3A illustrates a longitudinal aberration curve of the ocular assembly of embodiment 1.
Figure 3B:
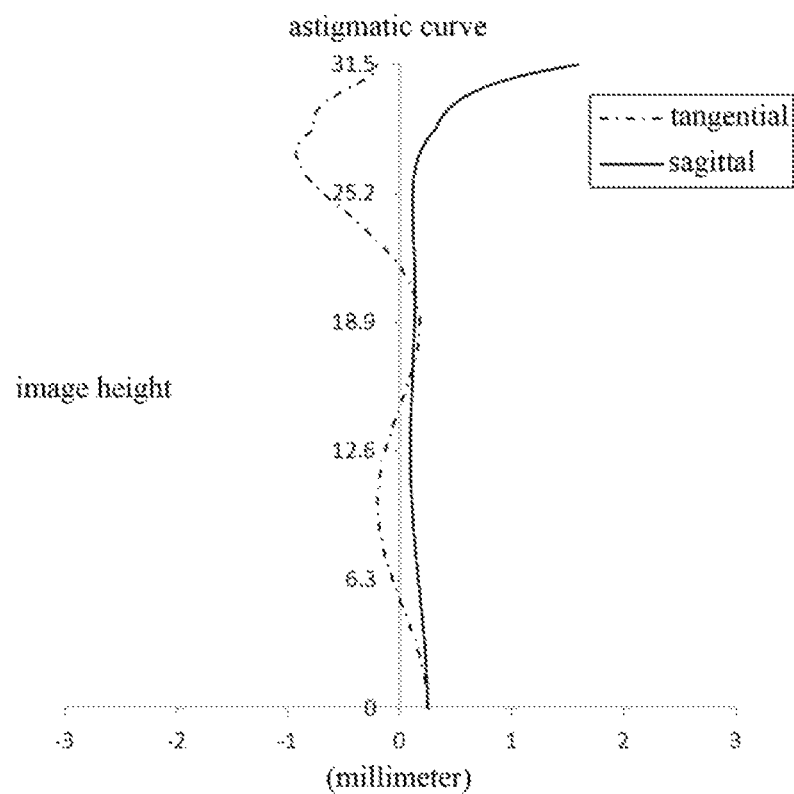
FIG. 3B illustrates an astigmatism curve of the ocular assembly of embodiment 1.
Figure 3C:
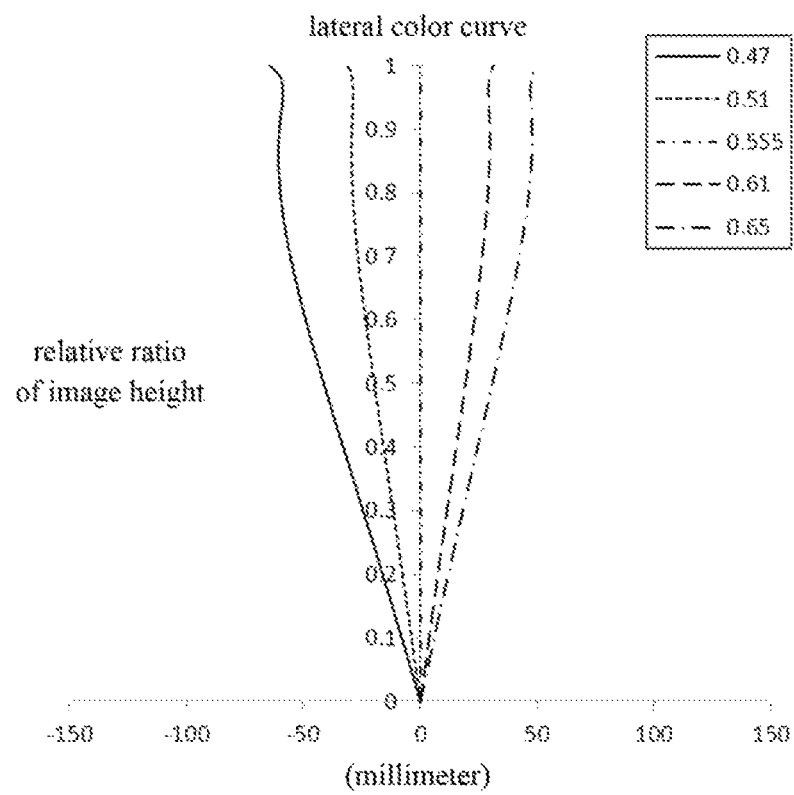
FIG. 3C illustrates a lateral color curve of the ocular assembly of embodiment 1.

FIG. 3A illustrates the longitudinal aberration curve of the ocular assembly of embodiment 1, which represents the convergent focus deviation of the lights having different wavelengths after passing through the optical system. FIG. 2B illustrates the astigmatism curve of the ocular assembly of embodiment 1, which represents the curvature of the tangential surface and the curvature of the sagittal surface. FIG. 2C illustrates the lateral color curve of the ocular assembly of embodiment 1, which represents the deviation of different image heights on the image plane after the light passes through the ocular assembly. From the above description with reference to FIGS. 3A to 3C, it can be seen that the ocular assembly according to embodiment 1 can achieve a better imaging quality while satisfying the requirements of being wide-angle and being light and thin of the VR ocular.

Embodiment 2

Embodiment 2 of the ocular assembly of the present disclosure is described below with reference to FIGS. 4 to 5C. Except the parameters of the each lens of the ocular assembly, for example, the surface type, the curvature radius, the thickness, the material and the conic coefficient of each lens, and the high order coefficients of each mirror surface, etc., the ocular assembly described in embodiment 2 and the various embodiments below have the same structure configuration as the ocular assembly described in embodiment 1. For conciseness, some descriptions similar to those of embodiment 1 will be omitted.

Figure 4:
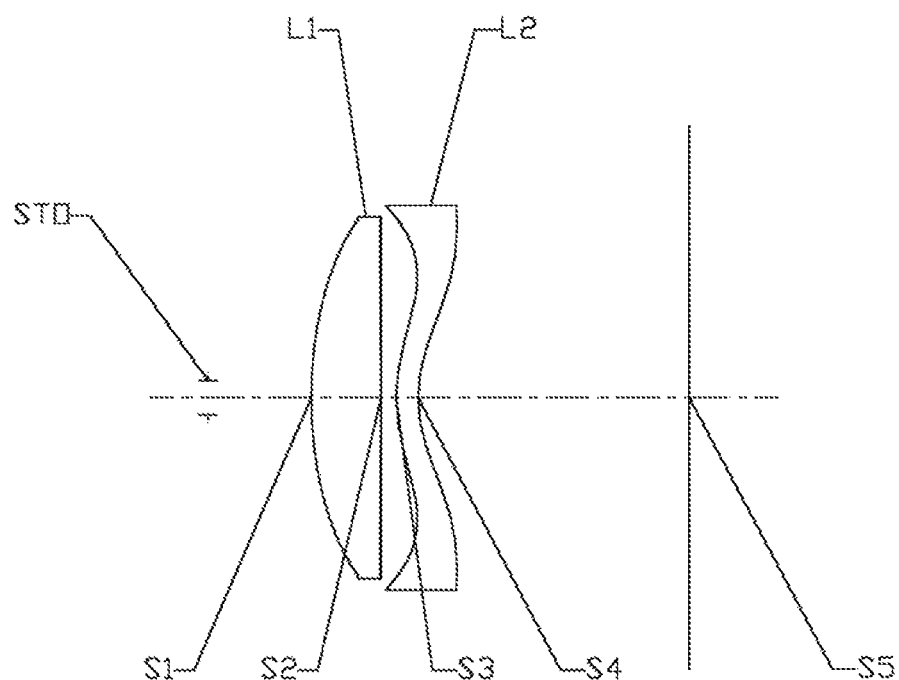
FIG. 4 illustrates a schematic structural view of the ocular assembly of embodiment 2 of the present disclosure.

FIG. 4 illustrates the schematic structural view of the ocular assembly according to embodiment 2 of the present disclosure. As illustrated in FIG. 4, the ocular assembly according to embodiment 2 sequentially includes a first lens L1, a second lens L2 and a photosensitive element from an object side to an image side along an optical axis.

The parameters of each optical surface of the first lens L1, the second lens L2 and the photosensitive element are shown in Table 3 below.

TABLE 3

| Surface No. | Surface Type | Curvature Radius | Thickness | Material | Conic Coefficient |
|---|---|---|---|---|---|
| OBJ | spherical | infinite | −2500.0000 | | |
| STO | spherical | infinite | 12.0000 | | |
| S1 | aspheric | 52.6831 | 8.0862 | 1.49/57.4 | 3.3518 |
| S2 | Fresnel | −24.9517 | 1.7615 | | −2.8223 |
| S3 | aspheric | 19.1563 | 2.5321 | 1.58/30.2 | −0.9343 |
| S4 | aspheric | 15.6594 | 31.4968 | | −2.0016 |
| S5 | spherical | infinite | | | |

The aspheric high order coefficients A4 and A6 of the first lens L1 and the second lens L2 are shown in table 4 below.

TABLE 4

| Surface No. | A4 | A6 |
|---|---|---|
| S1 | 1.5302E−06 | −2.4065E−09 |
| S2 | −1.4093E−05 | 2.2275E−08 |
| S3 | −7.8294E−05 | 4.1519E−08 |
| S4 | −4.8560E−05 | 3.9863E−08 |

In this embodiment 2, between the $i^{th}$ annular band and the $i+1^{th}$ annular band, which are counted from the paraxial area towards the edges on Fresnel structure surface, there may be a vertical space $z_i$, for example, $z_i=0.2$ mm. The depth $d_i$ of the $i^{th}$ annular band counted from the paraxial area towards the edges on the Fresnel structure surface may satisfy $0.0$ mm$<d_i\leq 0.119$ mm. Among a plurality of annular bands of the Fresnel structure surface, the angle $\theta_i$ between the straight bevel non-working surface Sb and the optical axis may be, for example, $\theta_i=2°$. Half of the maximal field-of-view HFOV of the ocular assembly may be set as for example, HFOV=47.49°. The effective focal length f1 of the first lens L1 and the total effective focal length f of the ocular assembly may satisfy, for example, f1/f=0.9, to reduce the chromatic aberration of the optical system. In order to ensure a relatively high imaging quality at a larger field-of-view, the axial distance TTL from the object-side surface S1 of the first lens L1 to the image plane and the total effective focal length f of the ocular assembly, for example, may be set as TTL/f=1.11. In order to make the lens structure compact to meet the requirement of being light and thin and the machining accuracy of the ocular assembly, the total effective focal length f of the ocular assembly and the axial distance TD from the object-side surface S1 of the first lens L1 to the image-side surface S4 of the second lens L2 may satisfy, for example, f/TD=2.33. In order to eliminate the spherical aberration of the optical system, the effective radius DT11 of the object-side surface S1 of the first lens L1 and the effective radius DT21 of the object-side surface S3 of the second lens L2 may satisfy, for example, DT11/DT21=0.93.

Figure 5A:
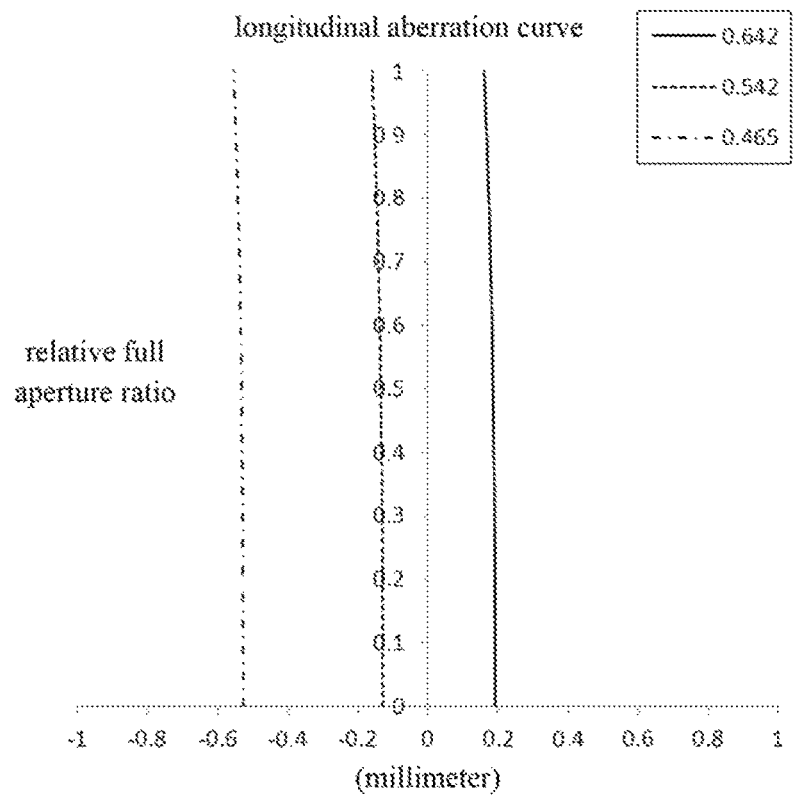
FIG. 5A illustrates a longitudinal aberration curve of the ocular assembly of embodiment 2.
Figure 5B:
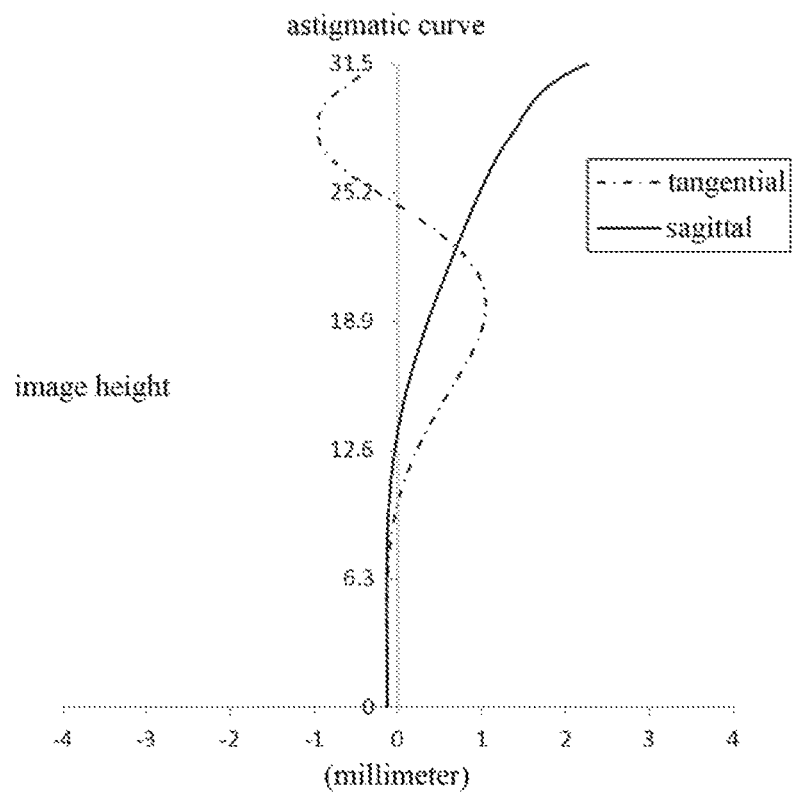
FIG. 5B illustrates an astigmatism curve of the ocular assembly of embodiment 2.
Figure 5C:
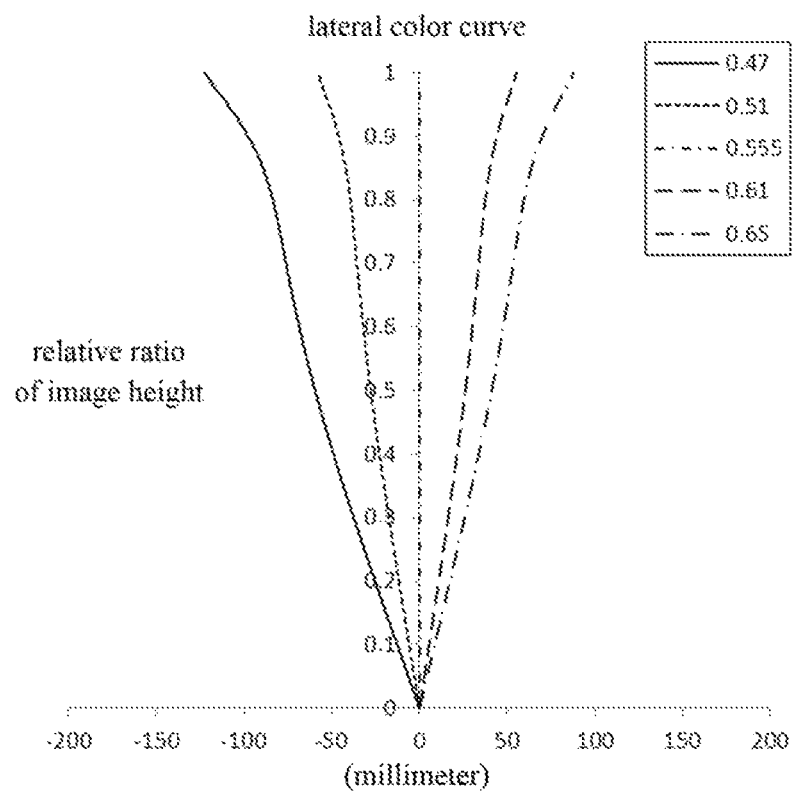
FIG. 5C illustrates a lateral color curve of the ocular assembly of embodiment 2.

FIG. 5A illustrates the longitudinal aberration curve of the ocular assembly of embodiment 2, which represents the convergent focus deviation of lights having different wavelengths after passing through the optical system. FIG. 5B illustrates the astigmatism curve of the ocular assembly of embodiment 2, which represents the curvature of the tangential surface and the curvature of the sagittal surface. FIG. 5C illustrates the lateral color curve of the ocular assembly of embodiment 2, which represents the deviation of different image heights on the image plane after the light passes through the ocular assembly. From the above description with reference to FIGS. 5A to 5C, it can be seen that the ocular assembly according to embodiment 2 can achieve a better imaging quality while satisfying the requirements of being wide-angle and being light and thin of the VR ocular.

Embodiment 3

Figure 6:
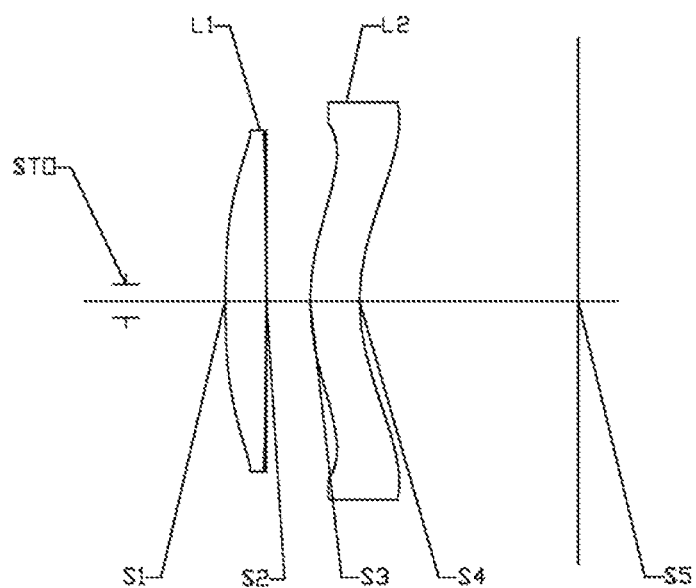
FIG. 6 illustrates a schematic structural view of the ocular assembly of embodiment 3 of the present disclosure.

The embodiment 3 of the ocular assembly of the present disclosure is described below with reference to FIGS. 6 to 7C. FIG. 6 illustrates the schematic structural view of the ocular assembly according to embodiment 3 of the present disclosure. As illustrated in FIG. 6, the ocular assembly according to embodiment 3 sequentially includes a first lens L1, a second lens L2 and a photosensitive element from an object side to an image side along an optical axis.

The parameters of each optical surface of the first lens L1, the second lens L2 and the photosensitive element are shown in table 5 below.

TABLE 5

| Surface No. | Surface Type | Curvature Radius | Thickness | Material | Conic Coefficient |
|---|---|---|---|---|---|
| OBJ | spherical | infinite | infinite | | |
| STO | spherical | infinite | 12.0000 | | |
| S1 | aspheric | 141.8424 | 4.9784 | 1.49/57.4 | 4.0138 |
| S2 | Fresnel | −23.7130 | 5.2694 | | −1.0234 |
| S3 | aspheric | 26.1942 | 5.9555 | 1.58/30.2 | −1.0446 |
| S4 | aspheric | 24.1601 | 26.3958 | | −3.4988 |
| S5 | spherical | infinite | | | |

The aspheric high order coefficients A4, A6 and A8 of the first lens L1 and the second lens L2 are shown in table 6 below.

TABLE 6

| Surface No. | A4 | A6 | A8 |
|---|---|---|---|
| S1 | 2.4212E−05 | −4.4965E−08 | 2.3008E−11 |
| S2 | 9.0284E−06 | 5.6179E−09 | −5.2359E−11 |
| S3 | −2.9983E−05 | 2.7887E−08 | −6.1919E−11 |
| S4 | −8.5108E−06 | −1.2309E−09 | −6.1275E−12 |

In this embodiment 3, between the $i^{th}$ annular band and the $i+1^{th}$ annular band, which are counted from the paraxial area towards the edges on Fresnel structure surface, there may be a vertical space $z_i$, for example, $z_i=0.4$ mm. The depth $d_i$ of the $i^{th}$ annular band counted from the paraxial area towards the edges on the Fresnel structure surface may satisfy $0.0$ mm$<d_i\leq 0.404$ mm. Among a plurality of annular bands of the Fresnel structure surface, the angle $\theta_i$ between the straight bevel non-working surface Sb and the optical axis is, for example, $\theta_i=3°$. Half of the maximal field-of-view HFOV of the ocular assembly may be set as, for example, HFOV=50°. The effective focal length f1 of the first lens L1 and the total effective focal length f of the ocular assembly satisfy, for example, f1/f=1.1, to reduce the chromatic aberration of the optical system. In order to ensure a relatively high imaging quality at a larger field-of-view, the axial distance TTL from the object-side surface S1 of the first lens L1 to the image plane and the total effective focal length f of the ocular assembly, for example, may be set as TTL/f=1.13. In order to make the lens structure compact to meet the requirement of being light and thin and the machining accuracy of the ocular assembly, the total effective focal length f of the ocular assembly and the axial distance TD from the object-side surface S1 of the first lens L1 to the image-side surface S4 of the second lens L2 may satisfy, for example, f/TD=4.8. In order to eliminate the spherical aberration of the optical system, the effective radius DT11 of the object-side surface S1 of the first lens L1 and the effective radius DT21 of the object-side surface S3 of the second lens L2 may satisfy, for example, DT11/DT21=0.92.

Figure 7A:
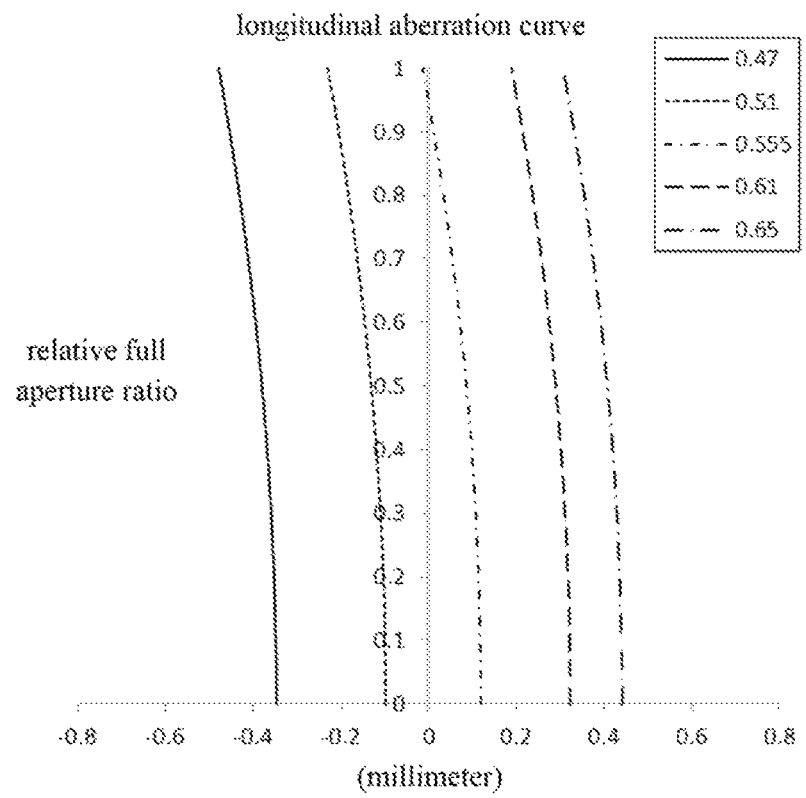
FIG. 7A illustrates a longitudinal aberration curve of the ocular assembly of embodiment 3.
Figure 7B:
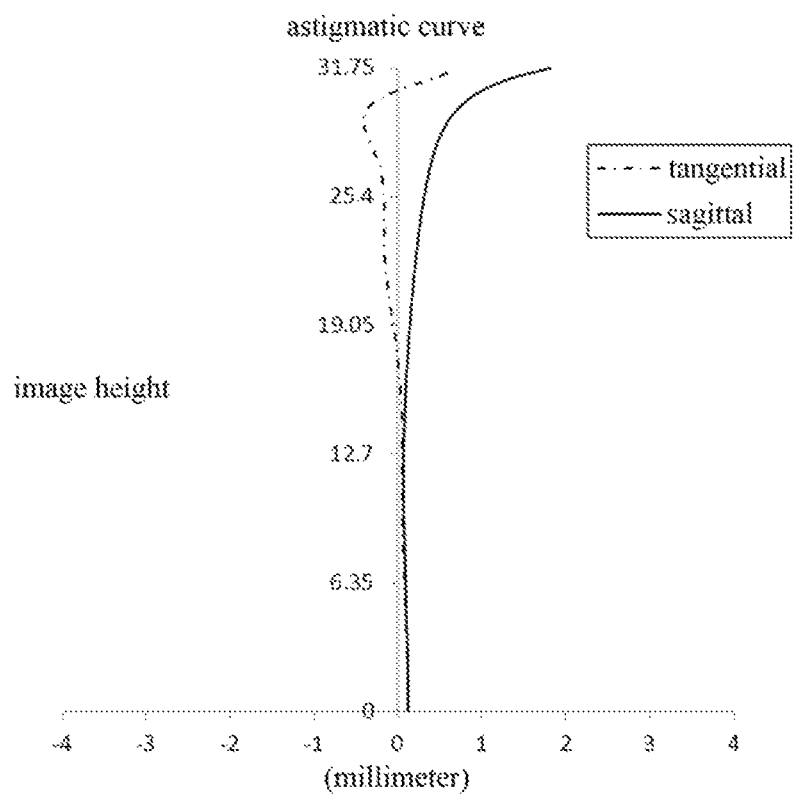
FIG. 7B illustrates an astigmatism curve of the ocular assembly of embodiment 3.
Figure 7C:
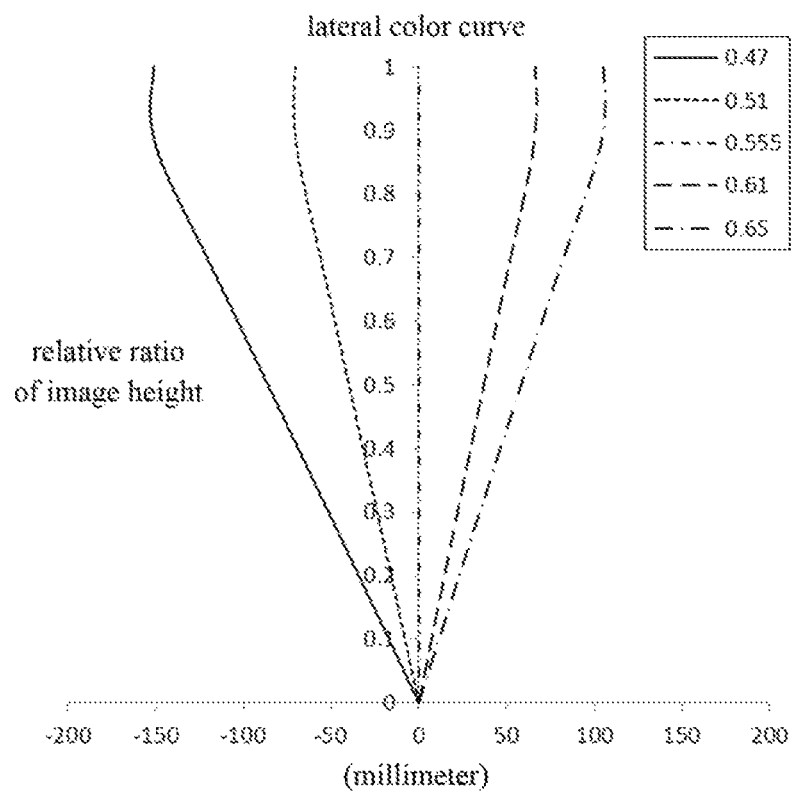
FIG. 7C illustrates a lateral color curve of the ocular assembly of embodiment 3.

FIG. 7A illustrates the longitudinal aberration curve of the ocular assembly of embodiment 3, which represents the convergent focus deviation of lights having different wavelengths after passing through the optical system. FIG. 7B illustrates the astigmatism curve of the ocular assembly of embodiment 3, which represents the curvature of the tangential surface and the curvature of the sagittal surface. FIG. 7C illustrates the lateral color curve of the ocular assembly of embodiment 3, which represents the deviation of different image heights on the image plane after the light passes through the ocular assembly. From the above description with reference to FIGS. 7A to 7C, it can be seen that the ocular assembly according to embodiment 3 can achieve a better imaging quality while satisfying the requirements of being wide-angle and being light and thin of the VR ocular.

Embodiment 4

Figure 8:
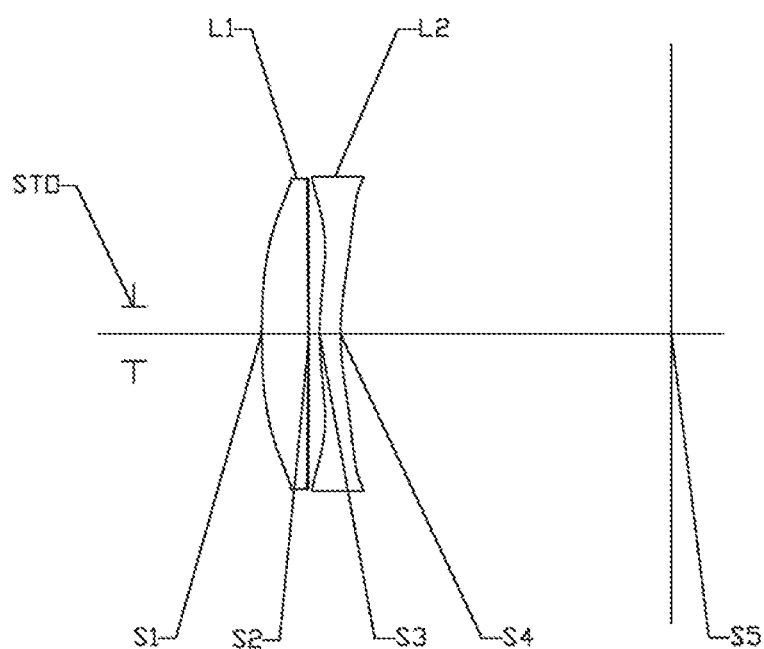
FIG. 8 illustrates a schematic structural view of the ocular assembly of embodiment 4 of the present disclosure.

The embodiment 4 of the ocular assembly of the present disclosure is described below with reference to FIGS. 8 to 9C. FIG. 8 illustrates the schematic structural view of the ocular assembly according to embodiment 4 of the present disclosure. As illustrated in FIG. 8, the ocular assembly according to embodiment 4 sequentially includes a first lens L1, a second lens L2 and a photosensitive element from an object side to an image side along an optical axis.

The parameters of each optical surface of the first lens L1, the second lens L2 and the photosensitive element are shown in table 7 below.

TABLE 7

| Surface No. | Surface Type | Curvature Radius | Thickness | Material | Conic Coefficient |
|---|---|---|---|---|---|
| OBJ | spherical | infinite | infinite | | |
| STO | spherical | infinite | 14.0000 | | |
| S1 | spherical | 104.9086 | 5.2069 | 1.54/56.1 | 11.8590 |
| S2 | Fresnel | −25.0204 | 1.1314 | | −9.9422 |
| S3 | spherical | 32.2120 | 2.2657 | 1.58/30.2 | −1.4669 |
| S4 | spherical | 26.5648 | 36.2613 | | −5.7081 |
| S5 | spherical | infinite | | | |

The aspheric high order coefficients A4, A6, A8, A10, A12 and A14 of the first lens L1 and the second lens L2 are shown in table 8 below.

TABLE 8

| Surface No. | A4 | A6 | A8 | A10 | A12 | A14 |
|---|---|---|---|---|---|---|
| S1 | 6.2579E−05 | −3.3219E−07 | 1.2939E−09 | −2.2595E−12 | −1.0851E−15 | 4.7851E−18 |
| S2 | −2.6742E−05 | 0.0000E+00 | 0.0000E+00 | 0.0000E+00 | 0.0000E+00 | 0.0000E+00 |
| S3 | −9.9350E−05 | 4.6313E−08 | 2.3547E−10 | 2.1386E−14 | 2.3750E−15 | −6.3978E−18 |
| S4 | −7.1156E−05 | 2.1921E−07 | −4.4219E−10 | 1.5656E−12 | −1.4830E−16 | −5.1578E−18 |

In this embodiment 4, between the $i^{th}$ annular band and the $i+1^{th}$ annular band, which are counted from the paraxial area towards the edges on Fresnel structure surface, there may be a vertical space zi, for example, zi=0.5 mm. The depth di of the $i^{th}$ annular band counted from the paraxial area towards the edges on the Fresnel structure surface may satisfy 0.0 mm<di≤0.254 mm. Among a plurality of annular bands of the Fresnel structure surface, the angle θi between the straight bevel non-working surface Sb and the optical axis is, for example, θi=5°. Half of the maximal field-of-view HFOV of the ocular assembly may be set as, for example, HFOV=43.43°. The effective focal length f1 of the first lens L1 and the total effective focal length f of the ocular assembly satisfy, for example, f1/f=0.91, to reduce the chromatic aberration of the optical system. In order to ensure a relatively high imaging quality at a larger field-of-view, the axial distance TTL from the object-side surface S1 of the first lens L1 to the image plane and the total effective focal length f of the ocular assembly, for example, may be set as TTL/f=1.09. In order to make the lens structure compact to meet the requirements of being light and thin and the machining accuracy of the ocular assembly, the total effective focal length f of the ocular assembly and the axial distance TD from the object-side surface S1 of the first lens L1 to the image-side surface S4 of the second lens L2 satisfy, for example, f/TD=2.46. In order to eliminate the spherical aberration of the optical system, the effective radius DT11 of the object-side surface S1 of the first lens L1 and the effective radius DT21 of the object-side surface S3 of the second lens L2 satisfy, for example, DT11/DT21=0.98.

Figure 9A:
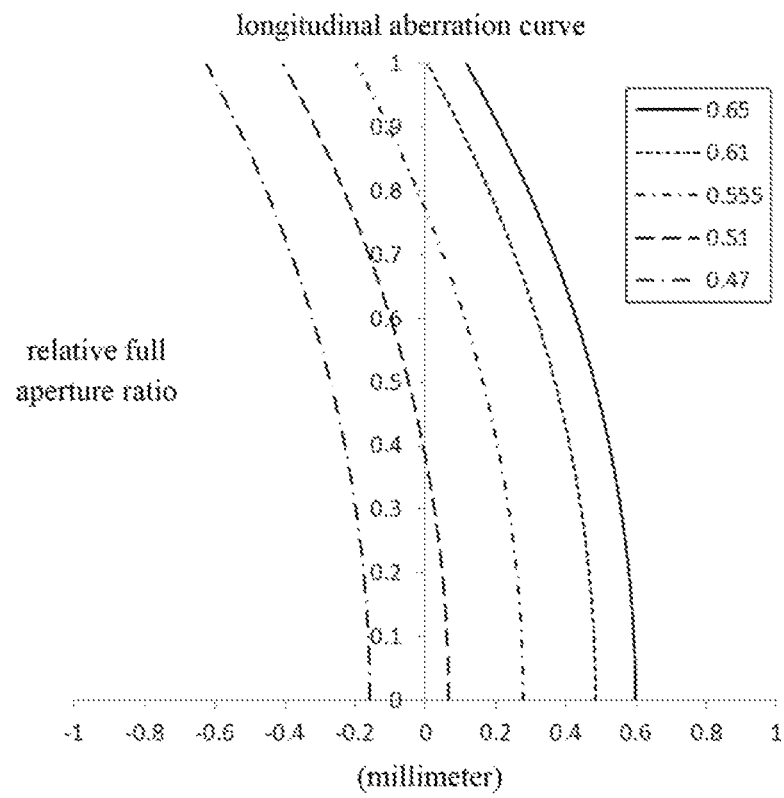
FIG. 9A illustrates a longitudinal aberration curve of the ocular assembly of embodiment 4.
Figure 9B:
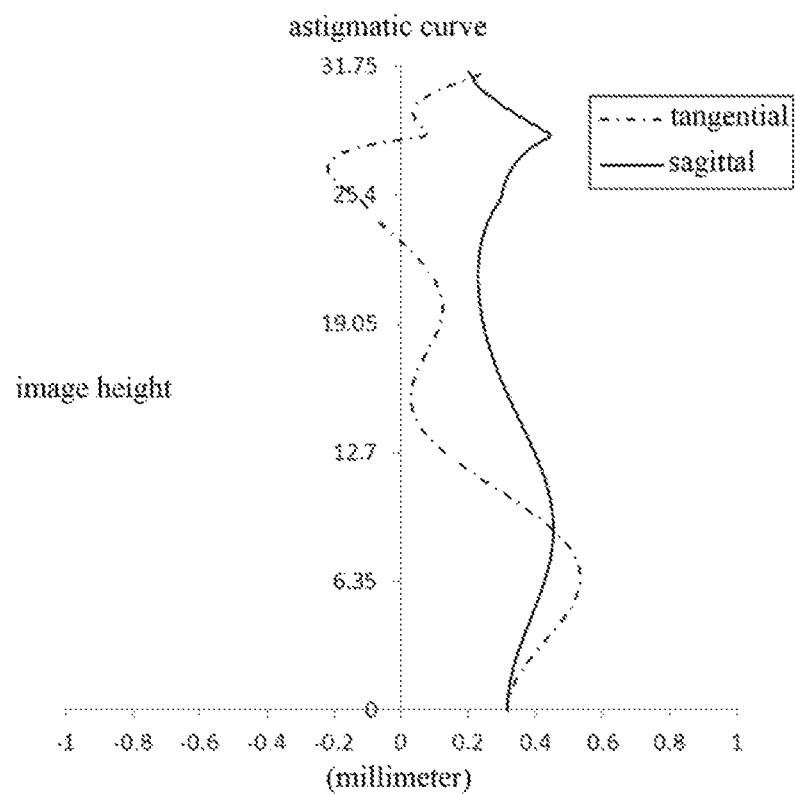
FIG. 9B illustrates an astigmatism curve of the ocular assembly of embodiment 4.
Figure 9C:
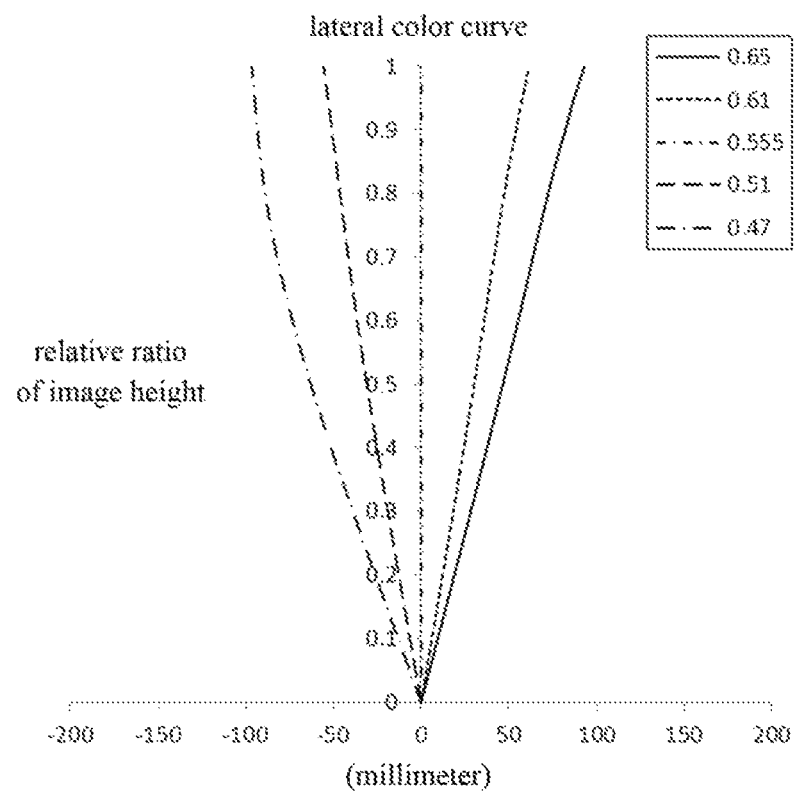
FIG. 9C illustrates a lateral color curve of the ocular assembly of embodiment 4.

FIG. 9A illustrates the longitudinal aberration curve of the ocular assembly of embodiment 4, which represents the convergent focus deviation of lights having different wavelengths after passing through the optical system. FIG. 9B illustrates the astigmatism curve of the ocular assembly of embodiment 3, which represents the curvature of the tangential surface and the curvature of the sagittal surface. FIG. 9C illustrates the lateral color curve of the ocular assembly of embodiment 4, which represents the deviation of different image heights on the image plane after the light passes through the ocular assembly. From the above description with reference to FIGS. 9A to 9C, it can be seen that the ocular assembly according to embodiment 4 can achieve a better imaging quality while satisfying the requirements of being wide-angle and being light and thin of the VR ocular.

Embodiment 5

Figure 10:
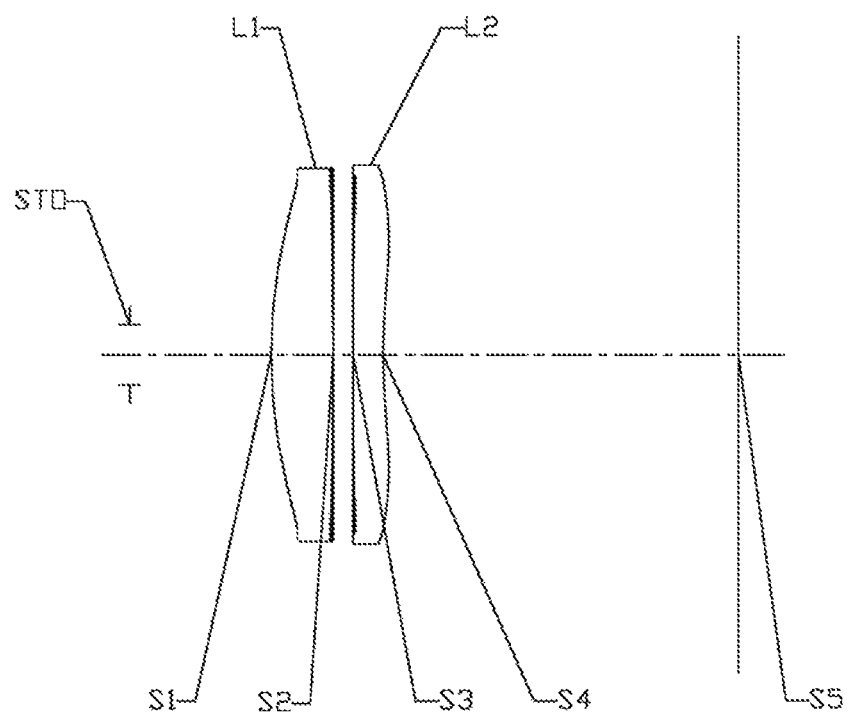
FIG. 10 illustrates a schematic structural view of the ocular assembly of embodiment 5 of the present disclosure.

The embodiment 5 of the ocular assembly of the present disclosure is described below with reference to FIGS. 10 to 11C. FIG. 10 illustrates the schematic structural view of the ocular assembly according to embodiment 5 of the present disclosure. As illustrated in FIG. 10, the ocular assembly according to embodiment 5 sequentially includes a first lens L1, a second lens L2 and a photosensitive element from an object side to an image side along an optical axis.

The parameters of each optical surface of the first lens L1, the second lens L2 and the photosensitive element are shown in table 9 below.

TABLE 9

| Surface No. | Surface Type | Curvature Radius | Thickness | Material | Conic Coefficient |
|---|---|---|---|---|---|
| OBJ | spherical | infinite | infinite | | |
| STO | spherical | infinite | 14.0000 | | |
| S1 | aspheric | 69.1684 | 6.1224 | 1.54/56.1 | 1.3052 |
| S2 | Fresnel | −32.9314 | 1.9737 | | −3.4989 |
| S3 | Fresnel | 48.5151 | 2.9184 | 1.58/30.2 | −36.0703 |
| S4 | aspheric | 45.4505 | 35.1453 | | 1.7981 |
| S5 | spherical | infinite | | | |

The aspheric high order coefficients A4, A6, A8, A10, A12 and A14 of the first lens L1 and the second lens L2 are shown in table 10 below.

TABLE 10

| Surface No. | A4 | A6 | A8 | A10 | A12 | A14 |
|---|---|---|---|---|---|---|
| S1 | 4.2498E−05 | −3.6900E−07 | 1.3911E−09 | −1.7768E−12 | −2.4493E−15 | 6.1352E−18 |
| S2 | −6.1229E−05 | −2.6178E−08 | 1.1869E−10 | 0.0000E+00 | 0.0000E+00 | 0.0000E+00 |
| S3 | −1.0346E−04 | 7.9416E−10 | 2.4101E−10 | 2.0379E−14 | −4.8560E−16 | −1.3974E−18 |
| S4 | −6.8542E−05 | 1.6950E−07 | −5.6112E−10 | 1.5352E−12 | −1.3489E−15 | −1.3847E−18 |

In this embodiment 5, between the $i^{th}$ annular band and the $i+1^{th}$ annular band, which are counted from the paraxial area towards the edges on Fresnel structure surface, there may be a vertical space zi, for example, zi=0.2 mm. The depth di of the $i^{th}$ annular band counted from the paraxial area towards the edges on the Fresnel structure surface may satisfy 0.0 mm<di≤0.318 mm. Among a plurality of annular bands of the Fresnel structure surface, the angle θi between the straight bevel non-working surface Sb and the optical axis is, for example, θi=3°. Half of the maximal field-of-view HFOV of the ocular assembly may be set as, for example, HFOV=43.51°. The effective focal length f1 of the first lens L1 and the total effective focal length f of the ocular assembly satisfy, for example, f1/f=1, to reduce the chromatic aberration of the optical system. In order to ensure a relatively high imaging quality at a larger field-of-view, the axial distance TTL from the object-side surface S1 of the first lens L1 to the image plane and the total effective focal length f of the ocular assembly, for example, may be set as TTL/f=1.1. In order to make the lens structure compact to meet the requirements of being light and thin and the machining accuracy of the ocular assembly, the total effective focal length f of the ocular assembly and the axial distance TD from the object-side surface S1 of the first lens L1 to the image-side surface S4 of the second lens L2 satisfy, for example, f/TD=3.8. In order to eliminate the spherical aberration of the optical system, the effective radius DT11 of the object-side surface S1 of the first lens L1 and the effective radius DT21 of the object-side surface S3 of the second lens L2 satisfy, for example, DT11/DT21=0.97.

Figure 11A:
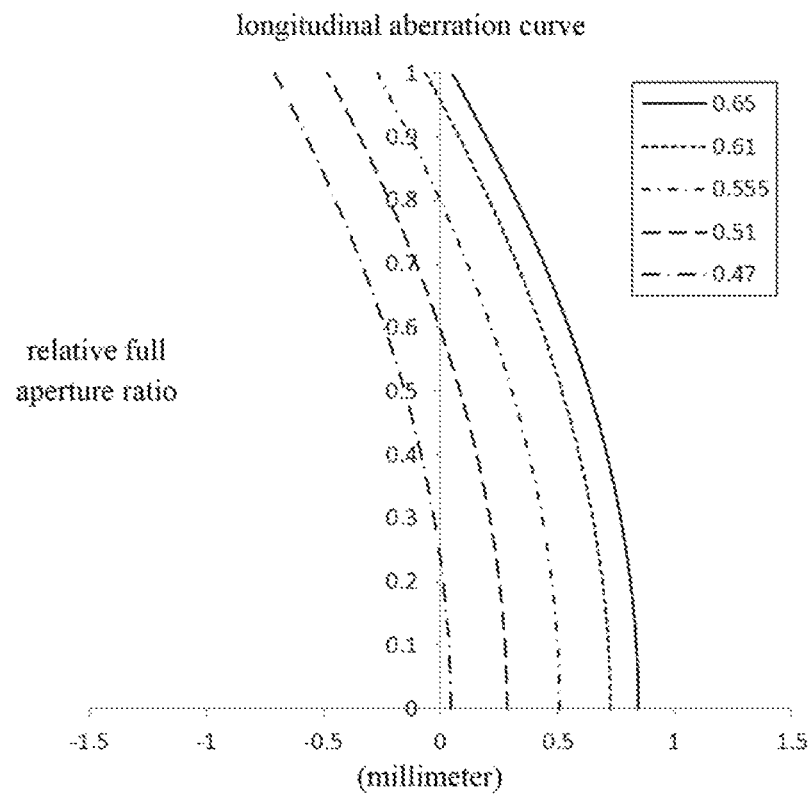
FIG. 11A illustrates a longitudinal aberration curve of the ocular assembly of embodiment 5.
Figure 11B:
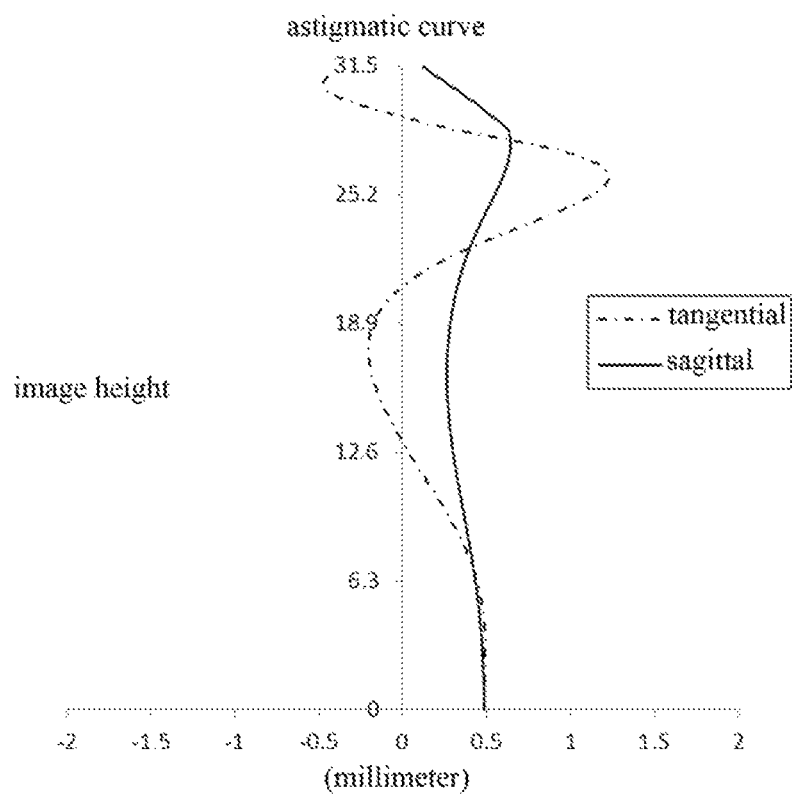
FIG. 11B illustrates an astigmatism curve of the ocular assembly of embodiment 5.
Figure 11C:
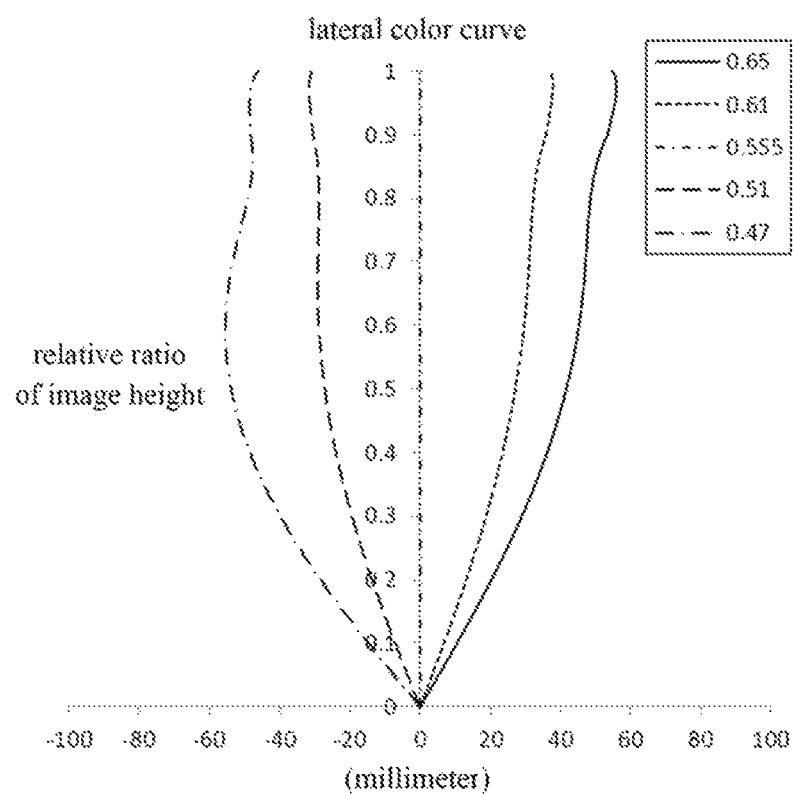
FIG. 11C illustrates a lateral color curve of the ocular assembly of embodiment 5.

FIG. 11A illustrates the longitudinal aberration curve of the ocular assembly of embodiment 5, which represents the convergent focus deviation of lights having different wavelengths after passing through the optical system. FIG. 11B illustrates the astigmatism curve of the ocular assembly of embodiment 5, which represents the curvature of the tangential surface and the curvature of the sagittal surface. FIG. 11C illustrates the lateral color curve of the ocular assembly of embodiment 5, which represents the deviation of different image heights on the image plane after the light passes through the ocular assembly. From the above description with reference to FIGS. 11A to 11C, it can be seen that the ocular assembly according to embodiment 5 can achieve a better imaging quality while satisfying the requirements of being wide-angle and being light and thin of the VR ocular.

The relationship among the parameters of each lens in embodiment 1 to embodiment 5 is shown in table 11 below.

TABLE 11

| Formula | Embodiment | | | | |
| | 1 | 2 | 3 | 4 | 5 |
|---|---|---|---|---|---|
| f | 39.58 | 39.45 | 37.69 | 41.29 | 41.83 |
| f1 | 27.02 | 35.50 | 41.60 | 37.54 | 41.75 |
| f2 | −70.94 | −199.44 | 6490.89 | −303.58 | −1897.39 |
| TTL | 47.58 | 43.88 | 42.60 | 44.87 | 46.16 |

TABLE 11-continued

| Formula | Embodiment | | | | |
| | 1 | 2 | 3 | 4 | 5 |
|---|---|---|---|---|---|
| Fno. | 7.73 | 7.75 | 9.46 | 6.80 | 6.84 |
| HFOV (°) | 47.50 | 47.49 | 50.00 | 43.43 | 43.51 |
| f1/f | 0.68 | 0.90 | 1.10 | 0.91 | 1.00 |
| θi | 1 | 2 | 3 | 5 | 3 |
| zi | 0.3 | 0.2 | 0.4 | 0.5 | 0.2 |
| di | 0~0.338 | 0~0.119 | 0~0.404 | 0~0.254 | 0~0.318 |
| TTL/F | 1.20 | 1.11 | 1.13 | 1.09 | 1.10 |
| f/TD | 3.19 | 2.33 | 4.80 | 2.46 | 3.80 |
| DT11/DT21 | 0.94 | 0.93 | 0.92 | 0.98 | 0.97 |

The present disclosure also proposes a display device. The display device may be, for example, a virtual reality display system. The display device may be equipped with the ocular assembly as described in the above various embodiments.

The exemplary embodiments of the present disclosure have been described above with reference to the drawings. It should be understood by those skilled in the art that the foregoing embodiments are merely examples for the purpose of illustration and are not intended to limit the scope of the present disclosure. Any modifications, equivalent substitutions, and the like made under the teaching of this disclosure and the protection scope of the claims should be included in the scope of protection of this disclosure.

What is claimed is:

1. An ocular assembly, comprising sequentially along an optical axis from an object side to an image side:
    a first lens with a positive refractive power having a convex object-side surface; and
    a second lens having a concave image-side surface,
    wherein at least one of an image-side surface of the first lens and an object-side surface of the second lens is formed as a Fresnel structure surface, and both the image-side surface of the first lens and the object-side surface of the second lens have a radius of curvature other than zero,
    wherein, half of a maximal field-of-view HFOV of the ocular assembly satisfies HFOV>40°, and wherein the Fresnel structure surface comprises a plurality of annular bands sequentially arranged to form a serrated surface, wherein a width zi of an ith annular band from a paraxial area toward an edge on the Fresnel structure surface of the ocular assembly satisfy 0.2 mm≤zi≤3.5 mm, wherein a depth di of the ith annular band satisfies 0 mm≤di≤0.5 mm, and wherein a distance between the image-side surface of the first lens and the object-side surface of the second lens along the optical axis is in a range of 0.6282 mm to 5.2694 mm.

2. The ocular assembly according to claim 1, wherein a total effective focal length f of the ocular assembly, and an axial distance TD from the object-side surface of the first lens to the image-side surface of the second lens satisfy 2<f/TD<5.

3. The ocular assembly according to claim 1, wherein an effective radius DT11 of the object-side surface of the first lens, and an effective radius DT21 of the object-side surface of the second lens satisfy 0.7<DT11/DT21<1.

4. The ocular assembly according to claim 1, wherein an effective focal length f1 of the first lens and a total effective focal length f of the ocular assembly satisfy 0.6<f1/f<1.5.

5. The ocular assembly according to claim 1, wherein in an ith annular band counted from a paraxial area toward an edge on the Fresnel structure surface of the ocular assembly, a working surface is aspheric, a non-working surface is a straight bevel, wherein an angle between the ith annular band and the optical axis satisfy: 0°≤θi≤5°.

6. The ocular assembly according to claim 1, wherein both the object-side surface and the image-side surface of the first lens are aspheric surfaces, and both the object-side surface and the image-side surface of the second lens are aspheric surfaces, and wherein a plurality of annular bands of the Fresnel structure surface are arranged on a substrate surface, the substrate surface being planar or curved.

7. A display device comprising the ocular assembly according to claim 1, wherein the display device is a head-mounted virtual reality display device.

8. An ocular assembly, comprising sequentially along an optical axis from an object side to an image side:

a first lens with a positive refractive power having a convex object-side surface;

a second lens having a concave image-side surface, wherein at least one of an image-side surface of the first lens and an object-side surface of the second lens is formed as a Fresnel structure surface, and both the image-side surface of the first lens and the object-side surface of the second lens have a radius of curvature other than zero, wherein an axial distance TTL from the object-side surface of the first lens to an image plane, and a total effective focal length f of the ocular assembly satisfy 1<TTL/f<1.5, and wherein the Fresnel structure surface comprises a plurality of annular bands sequentially arranged to form a serrated surface, wherein a width zi of an ith annular band from a paraxial area toward an edge on the Fresnel structure surface of the ocular assembly satisfy 0.2 mm≤zi≤3.5 mm, wherein a depth di of the ith annular band satisfies 0 mm≤di≤0.5 mm, and wherein a distance between the image-side surface of the first lens and the object-side surface of the second lens along the optical axis is in the range of 0.6282 mm to 5.2694 mm.

9. The ocular assembly according to claim 8, wherein the total effective focal length f, and an axial distance TD from the object-side surface of the first lens to the image-side surface of the second lens satisfy 2<f/TD<5.

10. The ocular assembly according to claim 8, wherein an effective radius DT11 of the object-side surface of the first lens, and an effective radius DT21 of the object-side surface of the second lens satisfy 0.7<DT11/DT21<1.

11. The ocular assembly according claim 8, wherein an effective focal length f1 of the first lens and a total effective focal length f of the ocular assembly satisfy 0.6<f1/f<1.5.

12. The ocular assembly according to claim 8, wherein in an ith annular band counted from a paraxial area toward an edge on the Fresnel structure surface of the ocular assembly, a working surface is aspheric, a non-working surface is a straight bevel, wherein an angle between the ith annular band and the optical axis satisfy: 0°≤θi≤5°.

13. The ocular assembly according to claim 8, wherein both the object-side surface and the image-side surface of the first lens are aspheric surfaces, and both the object-side surface and the image-side surface of the second lens are aspheric surfaces, and wherein a plurality of annular bands of the Fresnel structure surface are arranged on a substrate surface, the substrate surface being planar or curved.

14. A display device comprising the ocular assembly according to claim 8, wherein the display device is a head-mounted virtual reality display device.

15. An ocular assembly, comprising sequentially along an optical axis from an object side to an image side:

a first lens with a positive refractive power having a convex object-side surface;

a second lens having a concave image-side surface, wherein at least one of an image-side surface of the first lens and an object-side surface of the second lens is formed as a Fresnel structure surface, and both the image-side surface of the first lens and the object-side surface of the second lens have a radius of curvature other than zero, wherein a total effective focal length f of the ocular assembly, and an axial distance TD from the object-side surface of the first lens to the image-side surface of the second lens satisfy 2<f/TD<5, and wherein the Fresnel structure surface comprises a plurality of annular bands sequentially arranged to form a serrated surface, wherein a width zi of an ith annular band from a paraxial area toward an edge on the Fresnel structure surface of the ocular assembly satisfy 0.2 mm≤zi≤3.5 mm, wherein a depth di of the ith annular band satisfies 0 mm<di≤0.5 mm, and wherein a distance between the image-side surface of the first lens and the object-side surface of the second lens along the optical axis is in a range of 0.6282 mm to 5.2694 mm.

16. The ocular assembly according to claim 15, wherein an effective radius DT11 of the object-side surface of the first lens, and an effective radius DT21 of the object-side surface of the second lens satisfy 0.7<DT11/DT21<1.

17. The ocular assembly according claim 15, wherein an effective focal length f1 of the first lens and a total effective focal length f of the ocular assembly satisfy 0.6<f1/f<1.5.

18. The ocular assembly according to claim 15, wherein in an ith annular band counted from a paraxial area toward an edge on the Fresnel structure surface of the ocular assembly, a working surface is aspheric, a non-working surface is a straight bevel, wherein an angle between the ith annular band and the optical axis satisfy: $0° \leq \theta_i \leq 5°$.

19. The ocular assembly according to claim 15, wherein both the object-side surface and the image-side surface of the first lens are aspheric surfaces, and both the object-side surface and the image-side surface of the second lens are aspheric surfaces, and wherein a plurality of annular bands of the Fresnel structure surface are arranged on a substrate surface, the substrate surface being planar or curved.

20. A display device comprising the ocular assembly according to claim 15, wherein the display device is a head-mounted virtual reality display device.

\* \* \* \* \*